(12) United States Patent
Palovuori

(10) Patent No.: US 7,072,110 B2
(45) Date of Patent: * Jul. 4, 2006

(54) APPARATUS BASED ON PULSING FOR PROJECTION OF A STEREO OR MULTICHANNEL IMAGE

(76) Inventor: Karri Palovuori, Linnainmaanraitti 18 A 5, FIN-33580, Tampere (FI)

(*) Notice: Subject to any disclaimer, the term of this patent is extended or adjusted under 35 U.S.C. 154(b) by 0 days.

This patent is subject to a terminal disclaimer.

(21) Appl. No.: 10/481,260

(22) PCT Filed: Jun. 18, 2002

(86) PCT No.: PCT/FI02/00532
§ 371 (c)(1),
(2), (4) Date: Jun. 30, 2004

(87) PCT Pub. No.: WO03/003751
PCT Pub. Date: Jan. 9, 2003

(65) Prior Publication Data
US 2004/0233527 A1    Nov. 25, 2004

(30) Foreign Application Priority Data
Jun. 18, 2001 (FI) .................................. 20011292

(51) Int. Cl.
*G02B 27/22* (2006.01)
*G03B 35/18* (2006.01)
*H04N 13/04* (2006.01)

(52) U.S. Cl. .............................. 359/464; 348/56; 353/7; 345/8

(58) Field of Classification Search ................ 359/462, 359/464, 466, 465; 353/7, 8, 9, 85, 89, 86; 348/52, 53, 56; 345/8
See application file for complete search history.

(56) References Cited

U.S. PATENT DOCUMENTS

| 1,631,240 | A |   | 6/1927 | Amet |
| 3,334,816 | A |   | 8/1967 | Mizuno |
| 3,737,567 | A |   | 6/1973 | Kratomi |
| 4,076,399 | A | * | 2/1978 | Schlei .......................... 353/86 |
| 4,399,456 | A |   | 8/1983 | Zalm |
| 4,401,368 | A |   | 8/1983 | Drechsel et al. |
| 4,736,246 | A |   | 4/1988 | Nishikawa |

(Continued)

FOREIGN PATENT DOCUMENTS

| DE | 476372 | 5/1929 |
| DE | 3130638 | 2/1983 |
| DE | 3828262 A1 | 12/1989 |

(Continued)

*Primary Examiner*—Audrey Chang
(74) *Attorney, Agent, or Firm*—Venable LLP; Eric J. Franklin

(57) ABSTRACT

The invention relates to an apparatus for projecting a moving or still stereo or multichannel image (IM), said apparatus comprising at least a first (R) and at least a second (L) video projector, or the like, for projecting images intended for the left and the right eye of a viewer (H) alternately in time and in synchronization with the function of shutter glasses (G) or the like worn by the viewer. According to the invention, said video projectors are liquid crystal video projectors (PI) in which liquid crystal video projectors (PI) the illuminating, and thereby image-projecting light source (FP) of the liquid crystal matrix (LC) is a light source (FP) that produces light in a pulsed manner, the pulsing of said light source (FP) being arranged to occur in synchronization with the presentation of images. The pulsing of light sources according to the invention enables the projection of high-quality stereo image by means of affordable liquid crys-tal video projectors functioning at the normal image frequency.

4 Claims, 5 Drawing Sheets

U.S. PATENT DOCUMENTS

| | | |
|---|---|---|
| 4,955,540 A | 9/1990 | Fuller et al. |
| 5,067,653 A | 11/1991 | Araki et al. |
| 5,239,372 A | 8/1993 | Lipton |
| 5,245,319 A | 9/1993 | Kilian |
| 5,265,802 A | 11/1993 | Hobbs et al. |
| 5,270,752 A | 12/1993 | Kataoka et al. |
| 5,402,191 A | 3/1995 | Dean et al. |
| 5,621,424 A * | 4/1997 | Shimada et al. ............... 345/8 |
| 5,654,749 A | 8/1997 | Kanno |
| 5,726,703 A | 3/1998 | Izawa et al. |
| 5,989,128 A | 11/1999 | Baker et al. |
| 6,092,900 A | 7/2000 | Diedrich et al. |
| 2004/0001182 A1 | 1/2004 | Dyner |
| 2004/0233276 A1* | 11/2004 | Palovuori .................... 348/56 |

FOREIGN PATENT DOCUMENTS

| | | | |
|---|---|---|---|
| EP | 0502511 A2 | | 9/1992 |
| FR | 2773229 | | 7/1999 |
| GB | 2220278 A | | 1/1990 |
| JP | 7056235 | | 3/1995 |
| JP | 07284128 A | | 10/1995 |
| JP | 10023464 A | | 1/1998 |
| JP | 10336699 | | 12/1998 |
| JP | 2001125042 | * | 5/2001 |
| WO | WO 96/32665 | | 10/1996 |
| WO | WO 98/15128 | | 4/1998 |
| WO | WO 98/35264 | | 8/1998 |
| WO | WO 00/55687 | | 9/2000 |

* cited by examiner

APPARATUS BASED ON PULSING FOR PROJECTION OF A STEREO OR MULTICHANNEL IMAGE

FIELD OF THE INVENTION

The present invention relates to an apparatus for the projection of a stereo or multichannel image.

BACKGROUND OF THE INVENTION

Depth perception, or the capacity to perceive the environment in three dimensions, is based on the fact that the right and the left eye of a viewer look at the environment from a slightly different point and from a slightly different angle. Therefore, the images perceived by the right and the left eye differ from each other to some extent, and the difference between said images makes it possible to perceive the surrounding space in three dimensions.

It is known from prior art to record images in such a way that the 3-dimensional impression corresponding to the image recording situation is transmitted to the viewing person. These techniques are generally referred to as stereo imaging, and they are thus, in one way or another, based on the fact that a slightly different image is transmitted to the viewer's right and left eye.

One well-known example of the use of stereo imaging is Viewmaster™ viewing devices which make it possible to look at still images recorded on a photographic film separately for the right and the left eye by means of a viewing device to be placed in front of the viewer's eyes. The stereo images are recorded on the film by means of a special camera using two separate objective lenses.

Stereo imaging is used not only for presenting still images but also moving images.

From prior art, solutions are known for projecting a stereo image onto a screen by means of a film projector, wherein the same image can be simultaneously looked at by several viewers, for example in a cinema. In this case, the viewers wear special eyeglasses to prevent the image intended for the right eye from being visible to the left eye, and vice versa. The function of said glasses may be based on either polarization or colour filtering; in other words, the images intended for the right and the left eyes are encoded differently by means of polarization or colour coding. The image to be projected on the screen simultaneously includes superimposed images which have been encoded differently for the right and the left eye and from which, thanks to the special eyeglasses worn by the viewer, different images are conveyed to the viewer's right and left eye, to produce a 3-dimensional impression.

At present, when image material is primarily in electronic format and can thus be reproduced, for example, by means of a video signal, video projectors are used instead of film projectors to project a stereo image onto a screen or another projection surface. The image material to be presented by video projectors may be a stereo image recorded by special cameras with two objective lenses, or an image edited from an ordinary image by means of image processing, or also a stereo image developed in a completely "artificial" manner by means of a computer. At present, the projection of stereo images is mostly used in the reproduction of image material produced by a computer, for example to create various virtual environments.

A stereo image can be transferred and displayed in electronic format by means of a special stereo video signal, in which the images intended for the right and the left eye are arranged to alternate one after the other. Consequently, the image frequency of the stereo video signal is double compared to the image frequency of a conventional video signal, if the image frequency of the images intended for the right and the left eye is to be maintained at the normal image frequency level (25 or 30 images per second).

Consequently, when said stereo video image is presented to a viewer by means of a wide screen television projector, the images intended for the right and the left eye are thus projected in an alternating manner one after the other in time. To control these successive images to be perceived in the correct manner by the viewers right and left eye, the viewer wears so-called shutter glasses, whose operation is synchronized for the showing of images in succession. The shutter of the shutter glasses in front of the right eye is shut when the image intended for the left eye is projected, and in a corresponding manner, the shutter in front of the left eye Is shut when the image intended for the right eye is projected. The operation of the shutter glasses is typically based on the use of liquid crystal shutters.

When a single video projector is used for projecting a stereo video signal, this will set considerable demands on the video projector, because the video projector must now, in principle, be capable of operating at a double image frequency (50 or 60 images per second) compared to the normal image frequency (25 or 30 images per second). When a computer image is being displayed, the image frequency established for images intended for one eye is even higher than for normal video images, 80 images per second, wherein the image frequency for stereo images becomes as high as 120 images per second.

Because of this, single video projectors which are suitable for projecting a stereo video signal are thus based on the CRT (cathode ray tube) technology, well known as such, which makes such high image frequencies possible but which also makes the structure of projectors relatively complex and thereby expensive. Liquid crystal video projectors, which are less expensive and otherwise considerably simpler from the technical point of view, cannot be used in a corresponding manner for this purpose, because due to the lag of liquid crystal matrix elements, they do not have the capacity for the sufficiently high projecting rates required by the double image frequency.

For the above-mentioned reason solutions have also been developed, in which image signals intended for the right and the left eye are separated from the stereo video signal to two different video projectors. Thus, instead of special CRT projectors, the video projectors used can be less expensive projectors operating at a normal image frequency, for example projectors based on the liquid crystal matrix. The images of said two projectors are focused on top of each other, superimposed simultaneously by crosswise light polarizations, and the image thus formed is viewed through eyeglasses polarized crosswise differently for the right and the left eye. Such an arrangement is known, for example, from the publication WO00/55687.

However, such solutions of prior art, using two projectors, are limited expressly to the use of polarization (or colour filtering) to separate the images intended for the right and the left eye from each other. In other words, in these systems, the images intended for the right and the left eye are projected to the viewer simultaneously and not sequentially in time as in systems using shutter glasses.

However, the use of polarization or colour filtering involves obvious disadvantages when compared with methods based on shutter glasses. In systems based on polarization, for example, tilting of the head by the viewer will change the filtering capacity of the polarization glasses worn by him/her. This is problematic when a stereo image is used, for example, to create a virtual environment, in which virtual environment the viewer is expected to move in relation to the stereo image projected to him/her. Both in systems using polarization and in those using colour filtering, the natural reproduction of colours is naturally poorer than in systems based on shutter glasses, in which the colour reproduction is substantially neutral when the liquid crystal shutters of the shutter glasses are open. Also, both the polarization and the colour filters significantly reduce the brightness of the image perceived by the viewer, because the image is now typically both projected and viewed through optical filters with a limited transmission.

In systems based on shutter glasses and using two projectors, the problem is that the operation of the projectors should be precisely synchronized with each other. In other words, the projector showing the image intended for the right eye must, in principle, not project the image when the other projector is projecting the image intended for the left eye. In spite of liquid crystal shutter glasses, or the like, worn by the viewer, if the video projector producing the image intended for the right eye projects an image or otherwise transmits light when the shutter of the shutter glass in front of the right eye is open, it can also be seen by the right eye, because in this case, for example polarization or colour filtering is typically not used for encoding of images. The above-mentioned unwanted "leaking" of the image or light crosswise to the other eye will naturally impair the depth impression and contrast of the stereo image as well as cause flicker of the image.

In liquid crystal video projectors, in which the light transmitted by a light source penetrates the liquid crystal matrix, and the image formed onto the liquid crystal matrix is projected by means of lense optics further to be superimposed on a projection surface, the limited rate of operation of the liquid crystal matrix will make the above-described synchronization of the images more difficult. Furthermore, a perfect contrast cannot be produced by the liquid crystal matrix, whose operation in the projector can be compared with the function of a slide in a slide projector. In other words, even though the aim is to control the liquid crystal matrix to be non-transparent, i.e. to reproduce a completely black image, a given portion of the light from the light source is always passed through the liquid crystal matrix and further onto the screen. This unwanted light impairs the quality of the stereo image produced.

Because of these facts, the production of a high-quality stereo image by means of two separate video projectors and the technique based on shutter glasses always requires, in practice, the use of video projectors which are of a relatively high quality and thereby relatively expensive. This is emphasized particularly in the reproduction of a stereo image produced by means of a computer, in which the total image frequency of the stereo image is even higher than that of a stereo image formed of a normal video image. Thus, in practice, the advantage to be achieved in the reproduction of a stereo image by means of two projectors in relation to the use of one special projector based on the CRT technology remains small, or, accordingly, the quality of the stereo image remains significantly poorer than the image quality achieved with the special projector.

SUMMARY OF THE INVENTION

The primary aim of the present invention is to present an apparatus which makes it possible to project a high-quality stereo image by using inexpensive liquid crystal video projectors, in such a way that, contrary to the prior art, the separation of the images for the viewer's right and left eye can, however, be performed by using technology expressly based on shutter glasses.

By means of the inventions together with the use of the shutter glasses, it is possible to achieve a clearly better image quality, for example greater image brightness and more natural colour reproduction, than in systems of prior art which are based on polarization or colour filtering.

By means of the invention, it is possible to avoid, efficiently and with low costs, the problems which would otherwise impair the quality of the stereo image and which are due, for example, to the synchronization of the projectors projecting the image to the right and the left eye, and/or the insufficient contrast when the shutter-glass technique is used.

To attain these purposes, the apparatus according to the invention is primarily characterized in what will be presented in the characterizing part of the independent claim 1.

The other dependent claims will present some preferred embodiments of the invention.

The basic idea of the invention is to eliminate undesired "leaking" of an image or light, as described above, crosswise between the right and the left eye by using light sources which emit light in a pulsed manner in connection with both the projector for projecting the image intended for the left eye and the projector for projecting the image intended for the right eye. According to the invention, the pulsing of the light power of the light sources is further synchronized with the operation of the shutter glasses worn by the viewer, in the following way.

When the shutter for the right eye of the shutter glasses worn by the viewer is open, the light power of the light source for the projector projecting the image intended for the left eye is controlled down, and respectively, the light power of the light source for the projector projecting the image intended for the right eye is controlled up in a pulsed manner. Correspondingly, when the shutter for the left eye of the shutter glasses is open, the light power of the projector intended for the right eye is controlled down and the light power of the projector for the left eye is controlled up in a pulsed manner. This arrangement will efficiently eliminate the perception of the image intended for the left eye by the viewer's right eye, and vice verse, for example due to the incomplete mutual synchronization of the liquid crystal matrices of the projectors and/or by the incomplete contrast produced by the liquid crystal matrices. In other words, by instantaneously controlling the light power of the light source for a single projector down at a given moment of time, the propagation of the image projected by said projector, to be perceived by the viewer, is also efficiently prevented.

In an advantageous embodiment of the invention, the light sources used for the liquid crystal projectors are flash tubes or lamps which provide a high momentary brightness with low costs and low consumption of electricity.

The following more detailed description of the invention by means of examples will more clearly illustrate, for anyone skilled in the art, preferred embodiments of the invention as well as advantages to be achieved with the invention in relation to prior art.

BRIEF DESCRIPTION OF THE DRAWINGS

In the following, the invention will be described in more detail with reference to the appended drawings, in which.

DETAILED DESCRIPTION OF THE INVENTION

Figure 1:
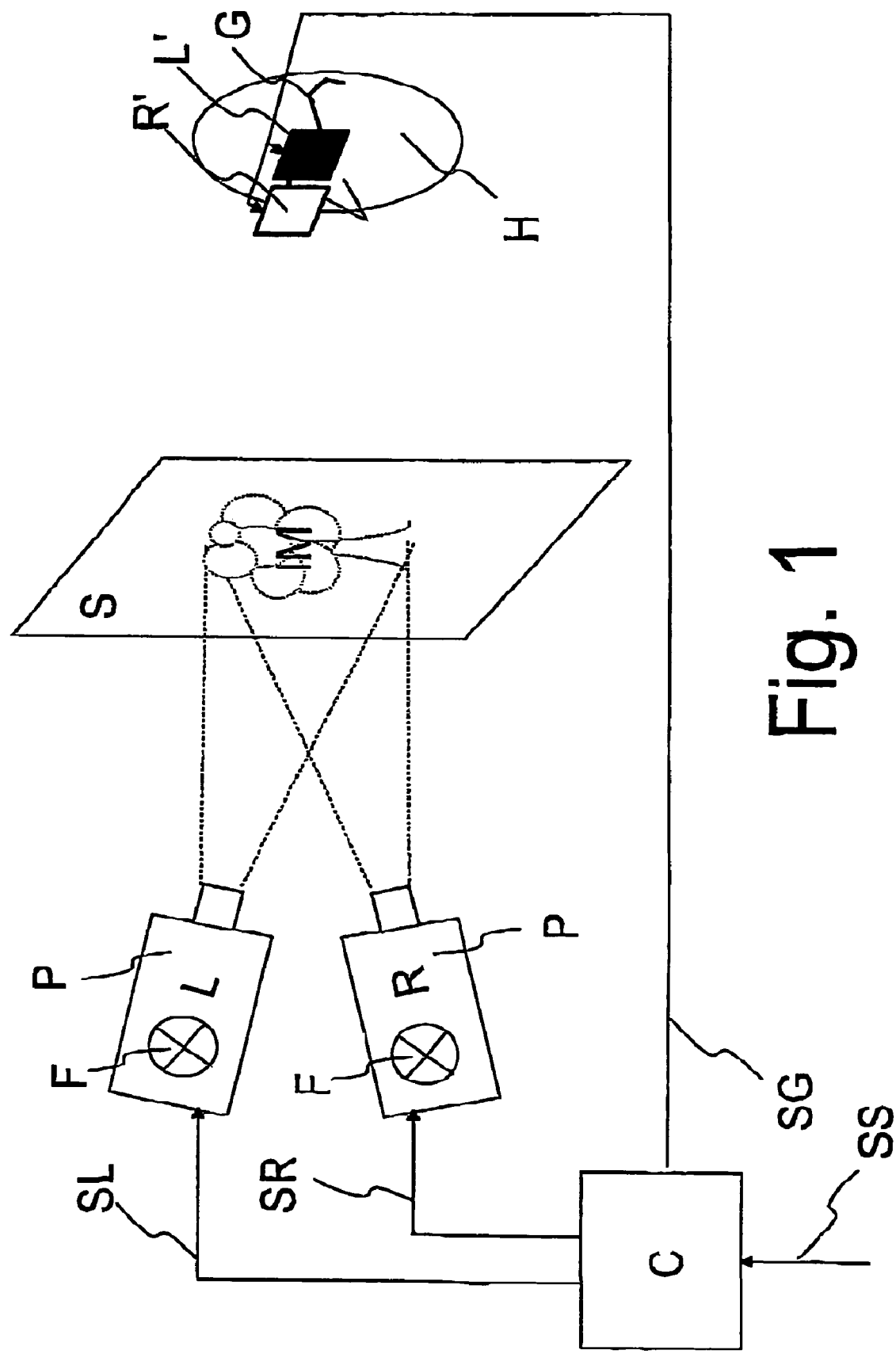
FIG. 1 shows, in principle, the projection of a stereo image according to prior art by means of two liquid crystal video projectors applying two continuous light sources.

FIG. 1 shows, in principle, the projection of a stereo image in such a way as it would take place according to prior art, by using two separate liquid crystal video projectors P and shutter glasses G. However, in the use of conventional liquid crystal video projectors of reasonable price, the quality of the stereo image that can be achieved in the situation of FIG. 1 in practice is poor because of the non-ideal properties of the liquid crystal matrices.

Image signals SR and SL intended for the right and the left eye are separated from a stereo video signal SS, for two separate video projectors R and L. This can be implemented by using a decoder C, decoders being commercially available and their function being described, for example, in patent publication WO00/55687. The right video projector R and the left video projector L project an image IM onto a screen or another projection surface S in such a way that the images intended for the right and the left eye of a viewer H are projected one after another in time. To control these temporally successive images to be perceived by the right and left eye of the viewer H in the correct manner, the viewer H wears so-called shutter glasses G, whose operation is synchronized by means of a signal SG for the reproduction of said successive images. The signal SG is preferably generated in a decoder C.

The shutter L' of the shutter glasses G in front of the left eye is shut when the image intended for the right eye is projected with the projector R, and in a corresponding manner, the shutter R' in front of the right eye is shut when the image intended for the left eye is projected with the projector L. The function of the shutter glasses G, as such, is well known from prior art and is typically based on the use of liquid crystal shutters.

Figure 2:
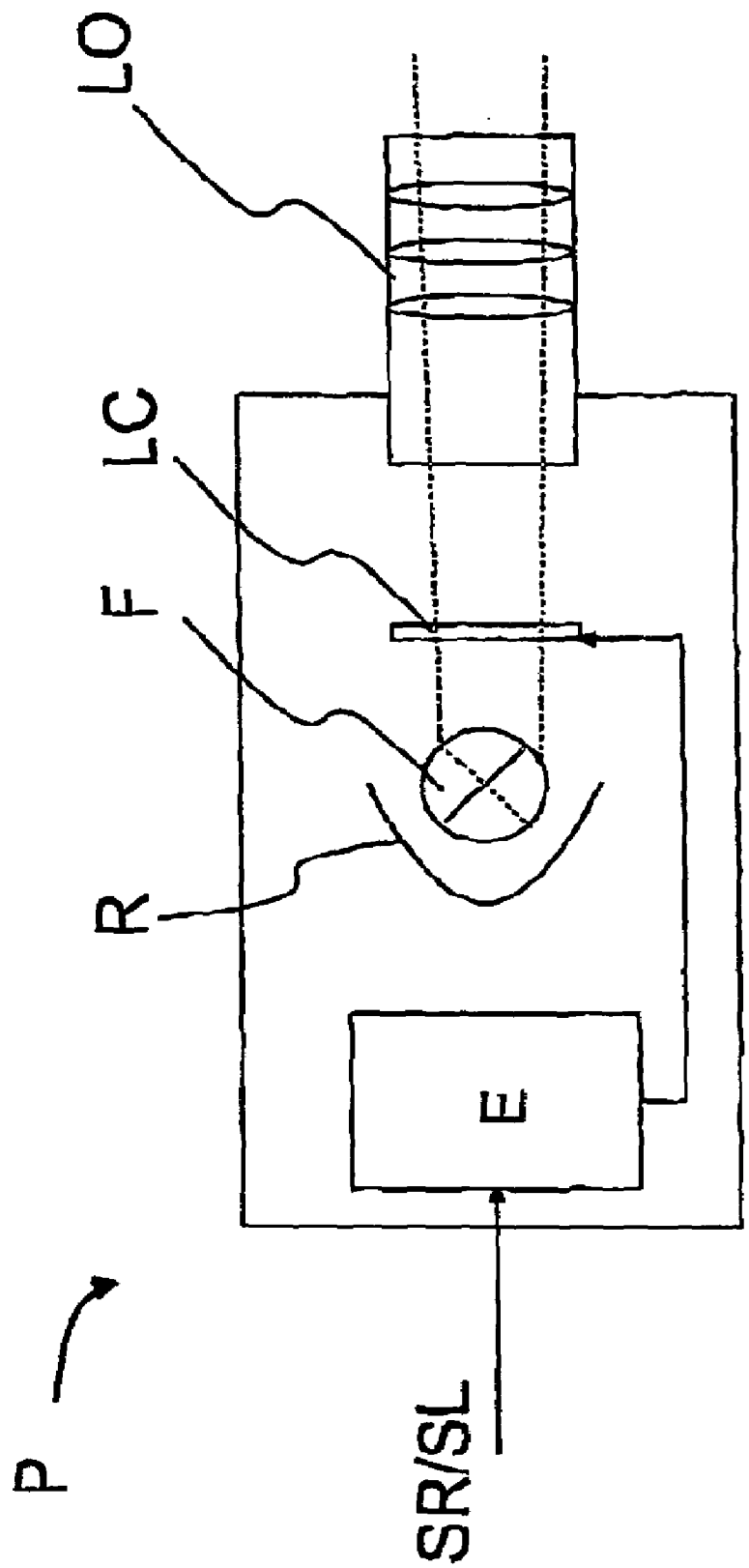
FIG. 2 shows, in principle, the essential components of a liquid crystal video projector according to prior art, based on a continuous light source.

FIG. 2 illustrates, in principle, the essential components and the principle of operation of a liquid crystal video projector P of prior art, based on a continuous light source.

In the liquid crystal video projector P, the light emitted by the continuous light source F is guided, preferably by means of a reflector P, through a liquid crystal matrix LC and lense optics LO, to be further superimposed on a projection surface, as shown in FIG. 1. The liquid crystal matrix LC, whose function in the projector can be compared with the function of a slide in a slide projector, is electrically controlled by electronics E to produce a desired image from a video signal SR or SL input in the projector. To produce a stereo image, as shown in FIG. 1, two separate liquid crystal video projectors P are used (indicated with L and R in FIG. 1), one being supplied the video signal SR and the other with the video signal SL.

In the liquid crystal video projector P according to prior art, the light source F is a continuous lamp, and the light projected by the projector is thus essentially influenced solely by controlling the transmission of the liquid crystal matrix LC according to the video signal SR, SL However, the liquid crystal matrix LC is not capable of producing a perfect contrast, that is, a completely "black" image, if necessary. In other words, even though the liquid crystal matrix LC is, in principle, controlled to reproduce a completely black Image, a given portion of the light from the light source F is always passed through the liquid crystal matrix LC and further to the projection surface P. The limited operating rate of the liquid crystal matrices LC also makes it more difficult to synchronize the images to be projected separately for the viewer's right and left eye by different projectors R, L. Consequently, in solutions of prior art, a problem impairing the quality of the image is thus the undesired cross-"leaking" of the image or light between the viewer's right and left eye. Naturally, this will significantly impair the depth impression and contrast of the stereo image, as well as cause flicker of the image.

Figure 3:
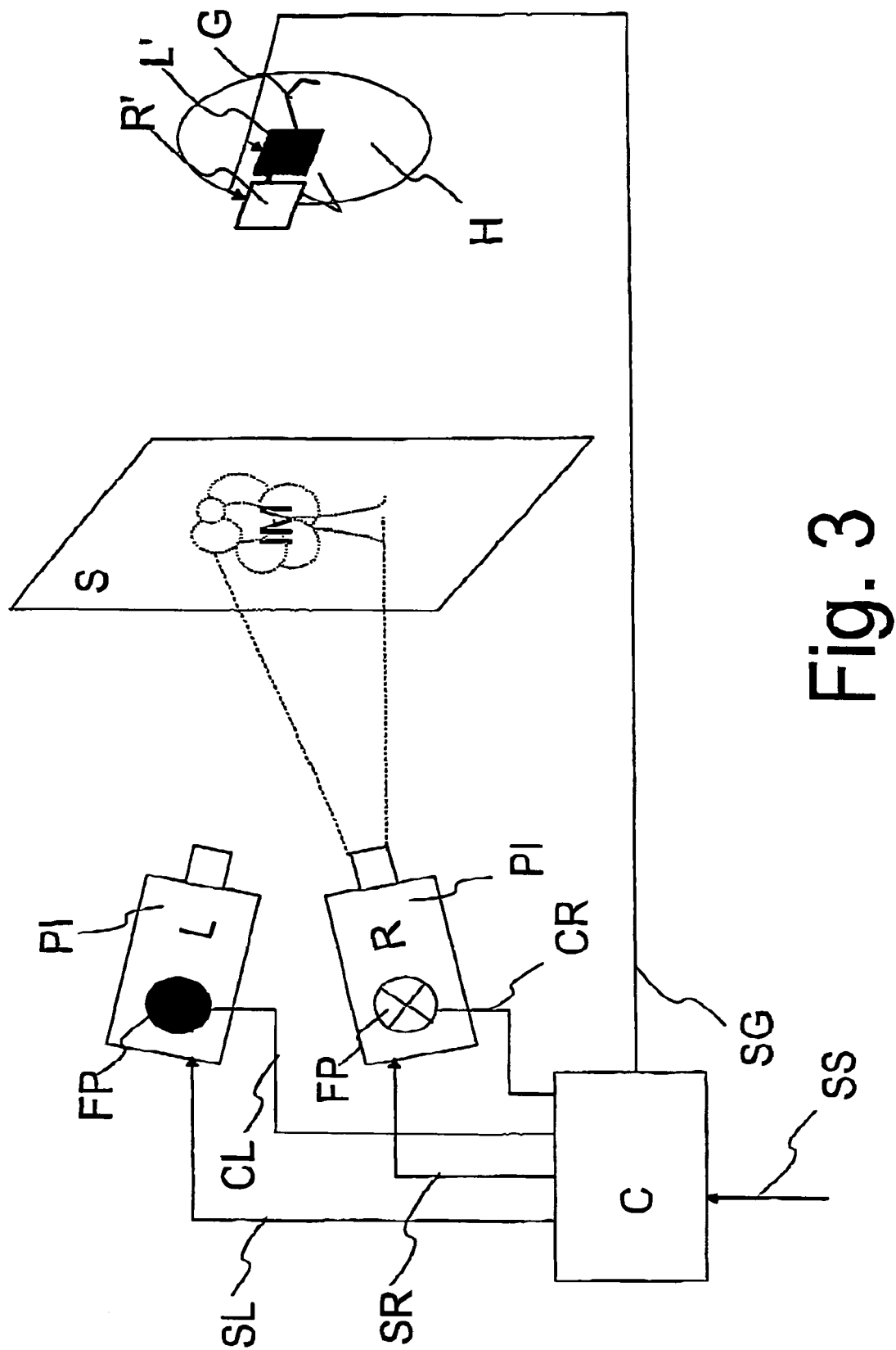
FIG. 3 shows, in principle, the projection of a stereo image according to the invention, by using two liquid crystal video projectors equipped with a pulsed light source.

FIG. 3 shows, in principle, the projection of a stereo image by using two liquid crystal video projectors PI, which projectors are, according to the invention, equipped with light sources FP emitting light in a pulse-like manner. The signals CR, CL needed for the control of the light sources FP for the projectors R, L are obtained, for example, from a decoder C, which decoder also generates the signal SG needed for the control of the viewer's shutter glasses G. According to the invention, the cross-"leaking" of light between the right and the left eye, impairing the quality of the stereo image perceived by the viewer H, is now prevented by synchronizing the signals CR, CL, SG with each other in a way to be described hereinbelow and suitably with the video signals SL, SR.

As shown in FIG. 3, when the shutter R' for the right eye of the shutter glasses G worn by the viewer H is open, the light power of the light source FP for the projector L projecting the image intended for the left eye is controlled down, and respectively, the light power of the light source FP for the projector R projecting the image intended for the right eye is controlled up in a pulsed manner. Correspondingly, when the shutter L' for the left eye of the shutter glasses is open, the light power of the light source FP for the projector P intended for the right eye is controlled down and the light power of the light source FP for the projector L for the left eye is controlled up in a pulsed manner. This arrangement will, in spite of the incomplete synchronization of the liquid crystal matrices LC of the projectors PI and/or the incomplete contrast produced by the liquid crystal matrices LC, efficiently prevent the perception of the image intended for the left eye by the viewer's right eye, and vice versa.

Figure 4:
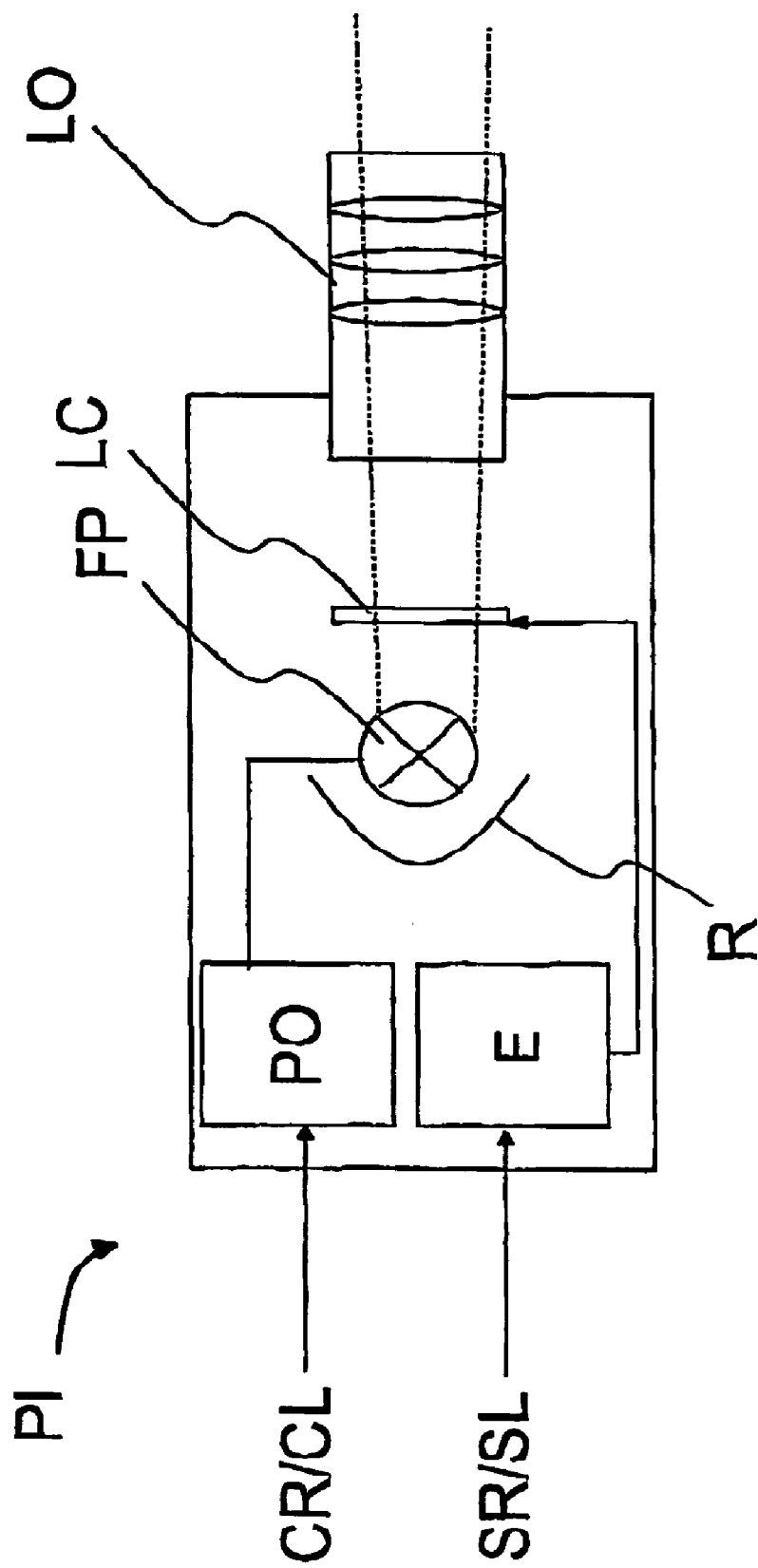
FIG. 4 shows the essential components of a liquid crystal video projector according to the invention, based on a pulsed light source.

FIG. 4 shows, in more detail, the essential components and functions of a liquid crystal video projector PI applying a pulsed light source FP according to the invention The substantial difference to the liquid crystal video projector P of prior art, as shown in FIG. 2, is the control of the light source FP according to a signal CR or CL. The signal CR (or CL) controls the power source PO supplying the light source FP in such a way that the light source FP emits light when the corresponding shutter R' (or L') of the shutter glasses G worn by the viewer is open, and the liquid crystal matrix LC is controlled ready for the projection of the image by means of a video signal SR (or SL).

Thus, the invention considerably reduces the demands set for the mutual synchronization of the liquid crystal matrices LC for the right R and left L projectors. When using the control of the light source according to the invention, the "updating" of images in the liquid crystal matrix LC may take place, in principle, freely at any moment in the period of time left between two successive flashes of the light source FP for said projector PI. In principle, the liquid crystal matrices LC of the projectors R and L may thus be arranged to project an image in a continuous manner as well, without dark periods which would otherwise be needed in connection with changing the images.

The light source FP used can be a flashlight-type flash tube or lamp which is capable of instantaneously producing a very high light power, The flash tube or lamp may be of a type in which instantaneous arc discharges are produced between the electrodes of the lamp by means of a high-voltage pulse and, correspondingly, there is no current flowing in the lamp between the pulses. The light source FP used can also be a discharge lamp with an excitation current flowing continuously between the lamp electrodes; in other words, a weak discharge is continuously maintained in the lamp, and the actual discharge to produce light power is achieved by an instantaneous increase in the current to be supplied to the lamp The advantage of the latter lamp type is that thanks to the excitation, the switching delay time of the lamp will be short and constant, wherein the scheduling of the actual flashes to produce light power can be made more precise.

However, the invention is not limited solely to the above-mentioned light sources, but the light source used may be any light source type which is obvious, as such, for a person skilled in the art and which produces a light power that can be electrically controlled to develop light pulses which are switched on and off at a sufficient rate.

Another significant advantage of the invention, to improve the quality of a stereo image, is that when the light power needed for projecting the image is produced in successive flashes, the average power consumed by the light source FP remains relatively low, in spite of the high instantaneous light power. This makes it possible to use small and compact light sources PO in the Input of the light sources FP, and reduces waste heat produced by both the power source and the light source itself. At the same time, the thermal load on the projector PI and particularly the liquid crystal matrix LC is reduced, which reduces the need for cooling.

Differing from that shown in FIGS. 1 and 3, it is obvious that the separate video signals SR and SL intended for the right R and the left L projectors may also be generated in another way than by decoding them separately from the stereo video signal SS. The video signals SR, SL may be generated directly, for example by a computer, by modifying a normal moving or still image by various image processing means which are known as such. The video signals SR, SL may also be produced from the beginning by means of a computer, for example as pure computer animations. Such a stereo image produced by a computer can be used, for example, in computer games or for creating various virtual environments and spaces. From the point of view of the invention, it is thus not essential how the video signals SR and SL needed for projecting the stereo image and intended separately for the right and the left eye are produced. From the point of view of the invention, the video signals SR, SL do not necessarily need to be combined into one stereo video signal SS at any stage. The image frequency of the video signals SR, SL may vary according to each application, and it may thus be higher or lower than the image frequencies applied in normal TV application (25 or 30 images per second).

The signal SG needed for the control of the shutter glasses G and the signals SI, RL needed for the control of the projectors PI can be formed, in ways obvious as such for a person skilled in the art, from the video signals SR, SL or in connection with the generation of said video signals.

At the present, there are commercially available display adapters or the like which are to be connected to a personal computer and which comprise several separate video outputs. Said video outputs can be programmed to produce images different from each other, which suitably generated images can be further used to produce a stereo image. Such display adapters can be used for the control of normal video projectors and further in combination with the solution according to the invention to produce a high-quality stereo image for various uses.

Figure 5:
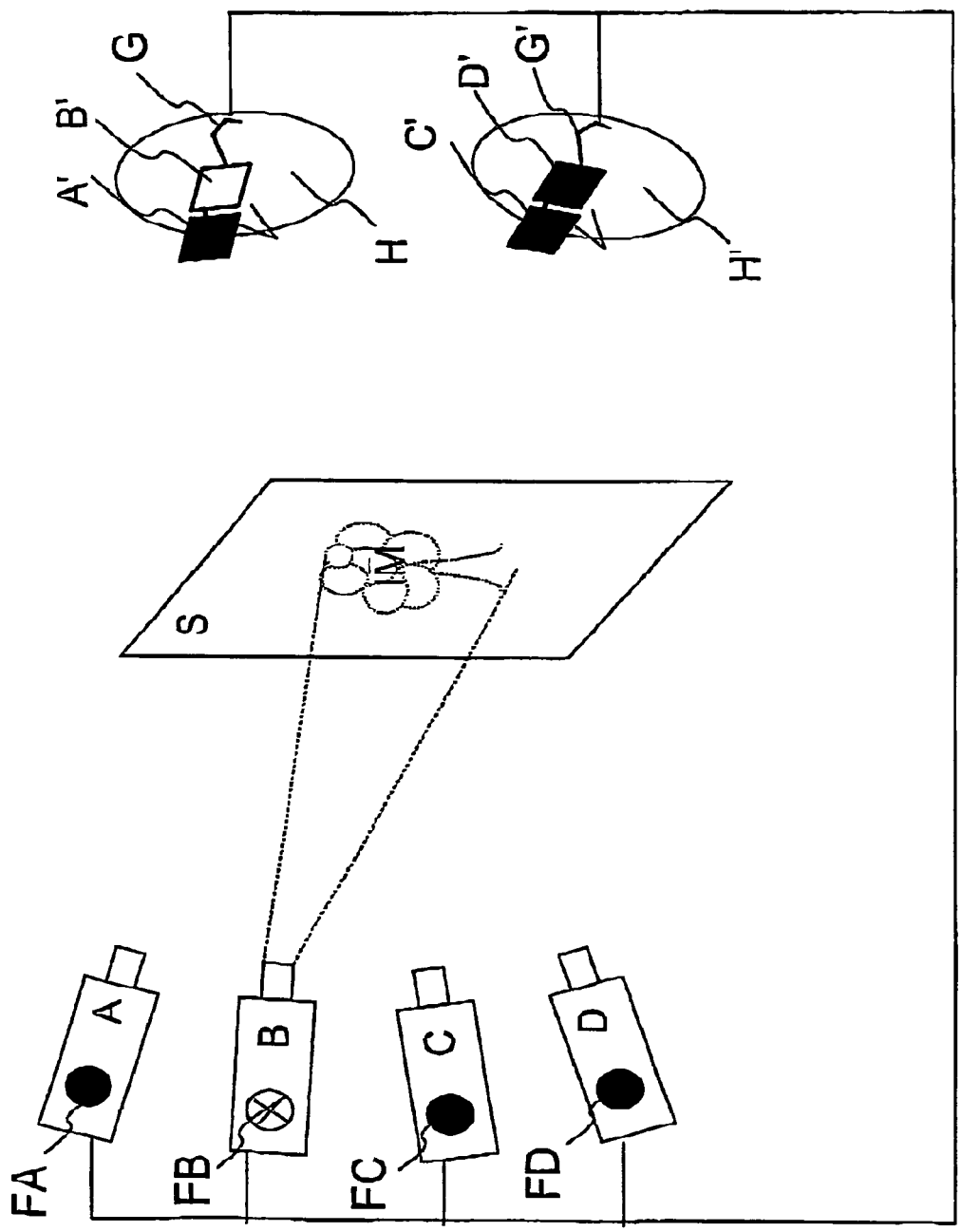
FIG. 5 illustrates the method of the invention applied in the projection of a stereo image to be produced for several viewers individually.

The invention is not limited to the production of a stereo image intended for one viewer only. FIG. 5 illustrates the method of the invention applied in the projection of a stereo image to be produced for several viewers individually.

In FIG. 5, video projectors A and B produce a stereo image intended for a viewer H. The control of the light power of the light sources FA and FB for the video projectors A and B is, according to the invention, synchronized with the operation of the shutters A', B' of the shutter glasses G worn by the viewer H. In a corresponding manner, video projectors C and D produce a stereo image intended for another viewer H'. Accordingly, the control of the light power of the light sources PC and FD for the video projectors C and D is, according to the invention, synchronized with the operation of the shutters C', D' of the shutter glasses G' worn by the viewer H'. The control of the light sources FA, FB, FC, FD and the operation of the shutters A', B', C', D' of the shutter glasses is synchronized with each other and, naturally, also with the rest of the functions of the projectors A, B, C, D (liquid crystal matrices LC), as shown in table 1 hereinbelow:

TABLE 1

Synchronization of light sources in FIG. 5.

| row | FA | FB | FC | FD | A' | B' | C' | D' |
| --- | --- | --- | --- | --- | --- | --- | --- | --- |
| 1. | illuminates | does not illuminate | does not illuminate | does not illuminate | open | shut | shut | shut |
| 2. | does not illuminate | illuminates | does not illuminate | does not illuminate | shut | open | shut | shut |
| 3. | does not illuminate | does not illuminate | illuminates | does not illuminate | shut | shut | open | shut |
| 4. | does not illuminate | does not illuminate | does not illuminate | illuminates | shut | shut | shut | open |

In the application of synchronization according to Table 1, viewers H and H' can both be shown their own stereo images, which stereo images may, for example, take into account the different positions of the viewers H, H' in relation to the projection surface S, wherein the viewers H and H' see an object IM from different angles.

When the superimposition of the stereo image is used, for example, to create a virtual space, it will be possible, by using the method of the invention, to show each viewer a different high-quality stereo image, which stereo image may, for example, represent the same object/view, but taking into account the viewers' different positions in relation to the image/object projected to them. Naturally, it is obvious that the system producing the stereo image should thus know the positions of the viewers H, H' in relation to the projection surface S.

If necessary, the synchronization shown in Table 1 can also be changed in such a way that the table can also be scanned through, row by row, in another order than in the order 1, 2, 3 and 4. The synchronization can be performed, for example, in the row order 1, 3, 2, 4 or 1, 4, 2, 3. By this method, it is possible to reduce the flicker of the image perceived by a single viewer H or H'.

It is obvious that the above-described different embodiments of the invention can be combined to produce various embodiments of the invention which comply, as such, with the spirit of the invention. Therefore, the above-presented examples must not be interpreted as restrictive to the invention, but the embodiments of the invention can be freely varied within the scope of the inventive features presented in the claims hereinbelow.

Naturally, it is obvious that even though the viewer H, H' in the above presented examples is placed on another side of the projection surface S than the projectors used for projecting a stereo or multi-channel image, it is normal in practice that both these projector apparatuses and the viewers are placed on the same side in relation to the projection surface S. Instead of a conventional screen, the image can also be projected on other stationary or non-stationary surfaces which are suitable for the purpose.

The synchronization of shutter glasses G worn by the viewer can be advantageously implemented by using wireless communication means, for example radio frequency and infrared links, which are known as such from prior art, wherein the movement of the viewer is not limited by wiring etc. to be otherwise connected to the shutter glasses G.

In a summary, it can be stated that the invention makes it possible to project a high-quality stereo or multi-channel image by using two or more separate liquid crystal video projectors, which operate at the normal image frequency and are inexpensive as such, and shutter glasses. To provide a corresponding image quality according to the prior art requires, in practice, the use of a special stereo image projector which is based on the GRT technology and is significantly more expensive.

The invention claimed is:

1. An apparatus for projecting a moving or still image comprising at least two channels, said apparatus comprising at least a first and at least a second video projector, for projecting images intended for the left and the right eye of a viewer alternately in time and in synchronization with the function of shutter glasses worn by the viewer, wherein video projectors are liquid crystal video projectors in which liquid crystal video projectors the illuminating and thereby image-projecting light source of a liquid crystal matrix is a light source that produces light in a pulsed manner, the pulsing of said light source being arranged to occur in synchronization with the presentation of images in such a manner that when the right-eye shutter of the shutter glasses worn by the viewer is open, the light power of the light source of at least the second projector projecting the image intended for the left eye is turned off and the light power of the light source of at least the first projector projecting the image intended for the right eye is turned on in a pulsed manner, and correspondingly when the left-eye shutter of the shutter glasses worn by the viewer is open, the light power of the light source of at least the first projector projecting the image intended for the right eye is turned off and the light power of the light source of at least the second projector projecting the image intended for the left eye is turned on in a pulsed manner.

2. The apparatus according to claim 1, wherein the light sources used in the liquid crystal video projectors are flash tubes or flash lamps based on electric discharge.

3. The apparatus according to claim 2, wherein the light sources are flash tubes or flash lamps based on electric discharge, in which a constant excitation current flows between the electrodes of the lamp, and the actual discharge that produces the light power is attained by instantaneously increasing the current supplied to the lamp.

4. The apparatus according to claim 1, wherein the apparatus is arranged to show two or several viewers a stereo image in such a manner that each viewer is shown a different image.

* * * * *